UNITED STATES PATENT OFFICE.

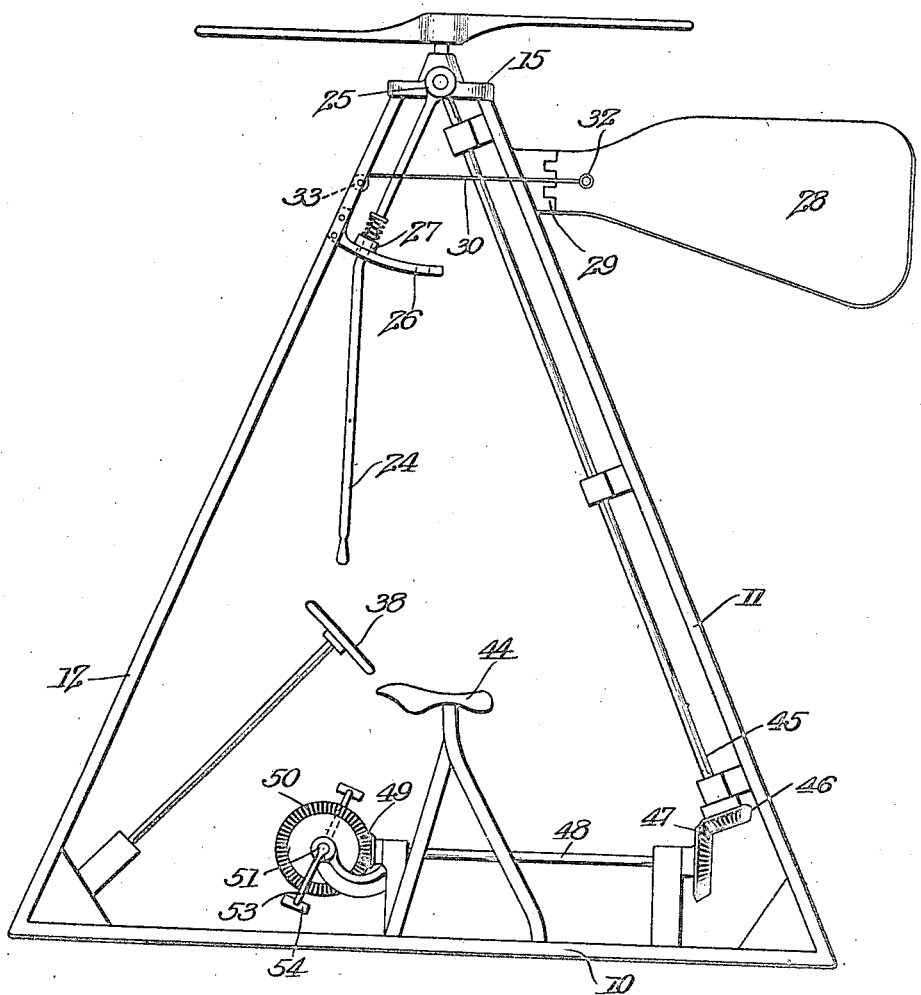

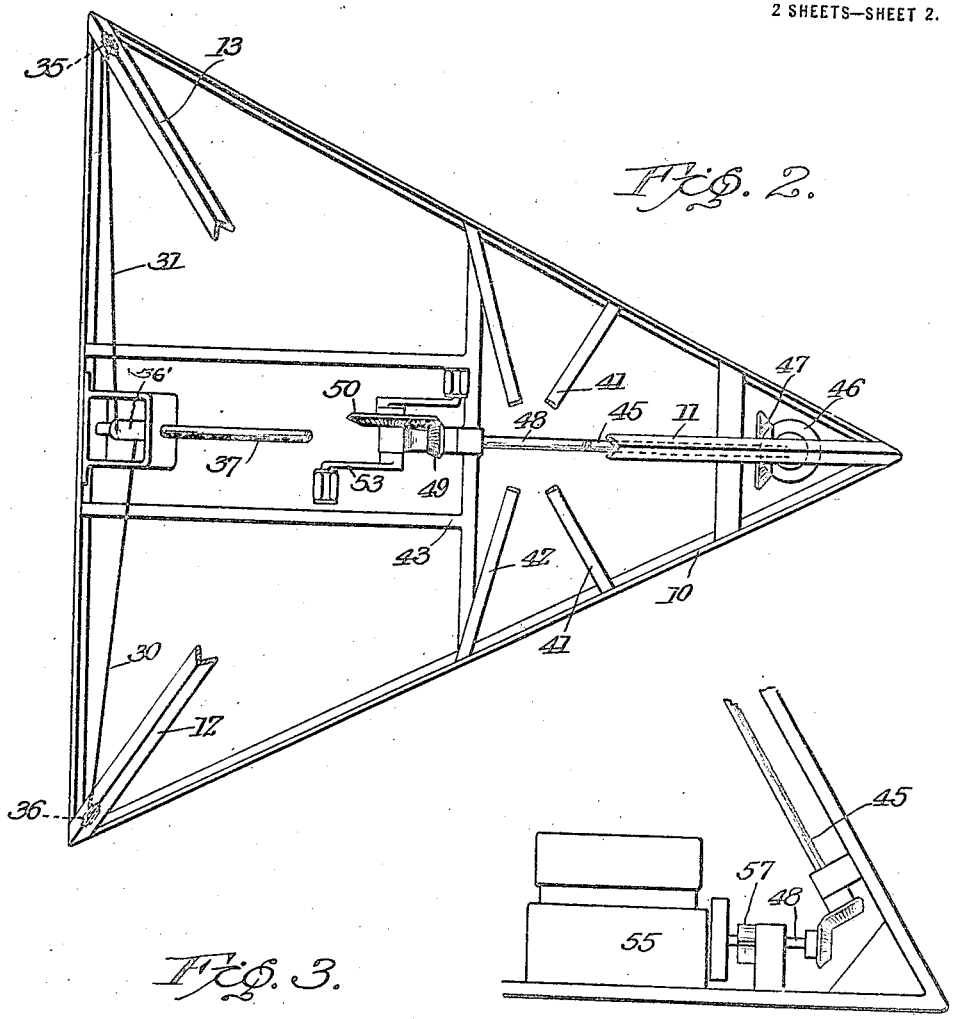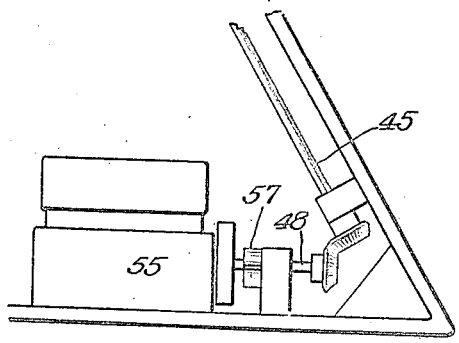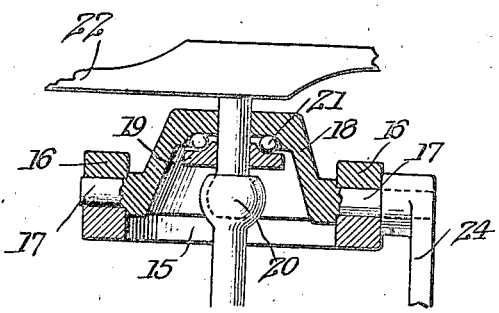

GARLAND DEAN BRUNER, OF URBANA, MISSOURI.

AIRCRAFT.

1,379,522.  Specification of Letters Patent.  Patented May 24, 1921.

Application filed December 6, 1920. Serial No. 428,603.

*To all whom it may concern:*

Be it known that I, GARLAND DEAN BRUNER, a citizen of the United States, residing at Urbana, in the county of Dallas and State of Missouri, have invented new and useful Improvements in Aircraft, of which the following is a specification.

This invention relates to aircraft of the helicopter type, or more definitely to a machine designed to be supported and driven by a propeller, to the exclusion of other supporting surfaces or devices.

The object is to provide a machine which may be caused to rise directly without traveling an appreciable distance from the point of taking off, and which may descend in the same manner, the propeller being so mounted that it may be caused to assume various angles with reference to the vertical, thereby permitting also of movement directly ahead when ascending or descending.

A further object is to provide in connection with a suitable framework, means for controlling the position of the propeller, and driving means for the latter.

A still further object is to provide a rudder which shall be so mounted that it may always be in the path of the air current produced by the propeller.

With the foregoing and other objects in view, the invention consists in the novel construction, combination and arrangement of elements hereinafter described and claimed, it being understood that modifications or variations in construction may be made within the scope of the claims, without departing from the spirit of the invention.

In the drawings, Figure 1 is a view of the machine in elevation, Fig. 2 is a horizontal section, through the framework, a portion of the propelling mechanism being in top plan, Fig. 3 is a vertical section through the mounting means for the propeller shaft, Fig. 4 is a detail of that form of the device in which an engine is employed for driving the propeller.

The framework includes the lower transverse elements 10 and the upwardly inclined members 11, 12 and 13 supporting an annular element 15. This element last named is provided with bearings 16 receiving the laterally extending devices, or trunnions 17 carried by a member 18 on the propeller shaft. A cone bearing is shown at 19 and a universal joint at 20. Ball bearings are designated 21. The weight of the entire device and the operator is thereby in ascent suspended from the propeller shaft. The propeller *per se* is designated 22 and may be caused to assume various angular positions by the operation of a controlling lever 24 connected as shown at 25. This lever is caused to engage a segment 26 carrying a frictional element 27, such as a coiled spring, designed to retain the lever in any position in which it may be set by the operation and thereby retaining the propeller in the position required for making a direct ascent, or for ascending or descending at an angle.

The rudder 28 is mounted for movement about an axis 29, and is under the control of cords or other flexible devices 30, and 31, connected respectively with the opposite ends of the bar 32. The cords pass over pulleys such as 33 near the upper portion of the framework, and also around pulleys 35 and 36 near the lower portion of the framework, and thence around the spool 36' on the shaft 37. This shaft carries a guiding or steering wheel 38 mounted in convenient position with reference to the seat of the operator. A frame comprising members 41, 42 and 43 supports a saddle 44 for the use of the operator, a bicycle saddle being suitable for the purpose.

The propeller shaft is driven by means of the shaft 45, through the universal joint before mentioned, this shaft carrying a beveled gear wheel 46 meshing with a similar gear wheel 47 on the shaft 48. The shaft last named carries a beveled pinion 49 meshing with a gear wheel 50. A crank shaft 51 serves to mount this gear wheel last named, the crank and pedals being shown at 53 and 54. I have also shown a motor conventionally at 55 for driving the shaft 48, through the medium of the gearing designated 57, when it is desired to employ a gasolene engine or other suitable motive power.

What is claimed:—

1. A device of the class described, comprising a framework including lower approximately horizontal elements and upwardly inclined elements extending toward each other, a propeller, a shaft therefor, and means for mounting the latter in the upper portion of the frame, permitting rotation of the propeller, means for driving the propeller, said means including a universal joint, said means for mounting the propeller shaft comprising an annular horizontal element supported by the framework, a tiltable element including trunnions supported by the annular element, means coöperating with the tiltable element providing a bearing for the propeller shaft, and a lever for rocking the tiltable element.

2. A device of the class described comprising a framework, a shaft mounted in the lower portion thereof, means for driving the shaft, a shaft mounted in the framework and extending upwardly from the shaft first named, gearing for driving the second named shaft from that first named, a propeller shaft connected with the second named shaft, a universal joint for effecting such connection, means for mounting the propeller shaft permitting of the shifting of the latter to various angular positions with reference to the vertical axis of the framework, a propeller mounted on the propeller shaft, and a rudder mounted to maintain a position in the path of the air current from the propeller, said means for mounting the propeller shaft comprising an annular horizontal element supported by the framework, a tiltable element including trunnions supported by the annular element, means coöperating with the tiltable element providing a bearing for the propeller shaft, and a lever for rocking the tiltable element.

3. A device of the class described comprising a framework including approximately horizontal elements and upwardly extending elements inclined toward each other, an annular element mounted in the upper portion of the frame, a shaft mounted in an inclined position and extending upwardly, a shaft mounted in approximately horizontal position and geared to the shaft first named, a crank shaft and means for driving the second named shaft from the crank shaft, a propeller shaft driven by the inclined shaft, a propeller carried by the propeller shaft, means for mounting said propeller shaft permitting the latter to move angularly with reference to the annular element, and a rudder mounted on the framework in the path of movement of the air current from the propeller.

In testimony whereof I affix my signature.

GARLAND DEAN BRUNER.